United States Patent
Bragstad et al.

(10) Patent No.: US 10,795,540 B2
(45) Date of Patent: *Oct. 6, 2020

(54) VISUALIZING MIGRATION OF A RESOURCE OF A DISTRIBUTED COMPUTING ENVIRONMENT

(71) Applicant: International Business Machines Corporation, Armonk, NY (US)

(72) Inventors: Lance Bragstad, Pine Island, MN (US); Bin Cao, Rochester, MN (US); James E. Carey, Rochester, MN (US); Mathew R. Odden, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 669 days.

This patent is subject to a terminal disclaimer.

(21) Appl. No.: 14/315,416

(22) Filed: Jun. 26, 2014

(65) Prior Publication Data

US 2015/0160815 A1 Jun. 11, 2015

Related U.S. Application Data

(63) Continuation of application No. 14/101,434, filed on Dec. 10, 2013.

(51) Int. Cl.
*H04L 29/08* (2006.01)
*G06F 3/0482* (2013.01)
(Continued)

(52) U.S. Cl.
CPC .......... *G06F 3/0482* (2013.01); *G06F 3/0484* (2013.01); *G06F 9/4856* (2013.01); *H04L 67/36* (2013.01)

(58) Field of Classification Search
CPC .......................... G06F 3/0482; G06F 3/0484
(Continued)

(56) References Cited

U.S. PATENT DOCUMENTS

| 5,969,705 A | 10/1999 | Fisher et al. |
| 8,332,689 B2 | 12/2012 | Timashev et al. |

(Continued)

OTHER PUBLICATIONS

U.S. Appl. No. 14/101,434, filed Dec. 10, 2013.
(Continued)

*Primary Examiner* — Matthew Ell
*Assistant Examiner* — Pritisha N Parbadia
(74) *Attorney, Agent, or Firm* — Bryan Bortnick

(57) ABSTRACT

Methods, apparatuses, and computer program products for visualizing migration of a resource of a distributed computing environment are provided. Embodiments include displaying, within a graphical user interface (GUI), one or more graphical resource representations. Each graphical resource representation represents a resource of a distributed computing environment. Each graphical resource representation is displayed in a particular location within the GUI according to a location of the resource within the distributed computing environment. Embodiments also include displaying, within the GUI, a first graphical migration representation. The first graphical migration representation represents a first transfer operation of a first resource of the distributed computing environment. Embodiments also include updating based on a progress of the first transfer operation, within the GUI at least one of: the first graphical migration representation and a location of at least one of the one or more graphical resource representations.

7 Claims, 7 Drawing Sheets

(51) Int. Cl.
  *G06F 9/48* (2006.01)
  *G06F 3/0484* (2013.01)
(58) Field of Classification Search
  USPC .......................................................... 715/734
  See application file for complete search history.

(56) References Cited

U.S. PATENT DOCUMENTS

| | | | |
|---|---|---|---|
| 8,332,847 B1 | 12/2012 | Hyser et al. | |
| 8,453,148 B1 * | 5/2013 | Hobbs | G06F 3/1454 |
| | | | 718/102 |
| 9,325,597 B1 * | 4/2016 | Clasen | H04L 43/0882 |
| 2007/0263984 A1 | 11/2007 | Sterner et al. | |
| 2008/0040760 A1 * | 2/2008 | Cho | H04N 21/4331 |
| | | | 725/87 |
| 2008/0162630 A1 * | 7/2008 | Moore | H04L 47/722 |
| | | | 709/203 |
| 2009/0030971 A1 * | 1/2009 | Trivedi | G06F 3/0486 |
| | | | 709/203 |
| 2010/0333028 A1 * | 12/2010 | Welsh | G06F 3/04847 |
| | | | 715/833 |
| 2011/0154213 A1 * | 6/2011 | Wheatley | G06F 3/0481 |
| | | | 715/738 |
| 2012/0030664 A1 * | 2/2012 | Demant | G06F 9/543 |
| | | | 717/171 |
| 2012/0096386 A1 * | 4/2012 | Baumann | G06Q 30/0601 |
| | | | 715/772 |
| 2013/0007216 A1 | 1/2013 | Fries et al. | |
| 2013/0055136 A1 * | 2/2013 | Aaron | H04M 15/8016 |
| | | | 715/772 |
| 2013/0205217 A1 * | 8/2013 | Schuller | G06F 3/01 |
| | | | 715/739 |
| 2013/0275901 A1 * | 10/2013 | Saas | G06F 3/0486 |
| | | | 715/769 |

OTHER PUBLICATIONS

"CloudBolt Software The Virtualization Practice", virtualizationpractice.com (online publication), accessed Sep. 17, 2013, 3 pages, URL: http://www.virtualizationpractice.com/partner-showcase/cloudbolt-software/.

* cited by examiner

VISUALIZING MIGRATION OF A RESOURCE OF A DISTRIBUTED COMPUTING ENVIRONMENT

CROSS-REFERENCE TO RELATED APPLICATION

This application is a continuation application of and claims priority from U.S. patent application Ser. No. 14/101,434, filed on Dec. 10, 2013.

BACKGROUND OF THE INVENTION

Field of the Invention

The field of the invention is data processing, or, more specifically, methods, apparatuses, and computer program products for visualizing migration of a resource of a distributed computing environment.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems can include a plurality of machines that share resources with each other. Allocating resources to each machine, user, software application, or other consumer of computing resources can often be burdensome and difficult.

SUMMARY

Methods, apparatuses, and computer program products for visualizing migration of a resource of a distributed computing environment are provided. Embodiments include displaying, within a graphical user interface (GUI), one or more graphical resource representations. Each graphical resource representation represents a resource of a distributed computing environment. Each graphical resource representation is displayed in a particular location within the GUI according to a location of the resource within the distributed computing environment. Embodiments also include displaying, within the GUI, a first graphical migration representation. The first graphical migration representation represents a first transfer operation of a first resource of the distributed computing environment. Embodiments also include updating based on a progress of the first transfer operation, within the GUI at least one of: the first graphical migration representation and a location of at least one of the one or more graphical resource representations.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
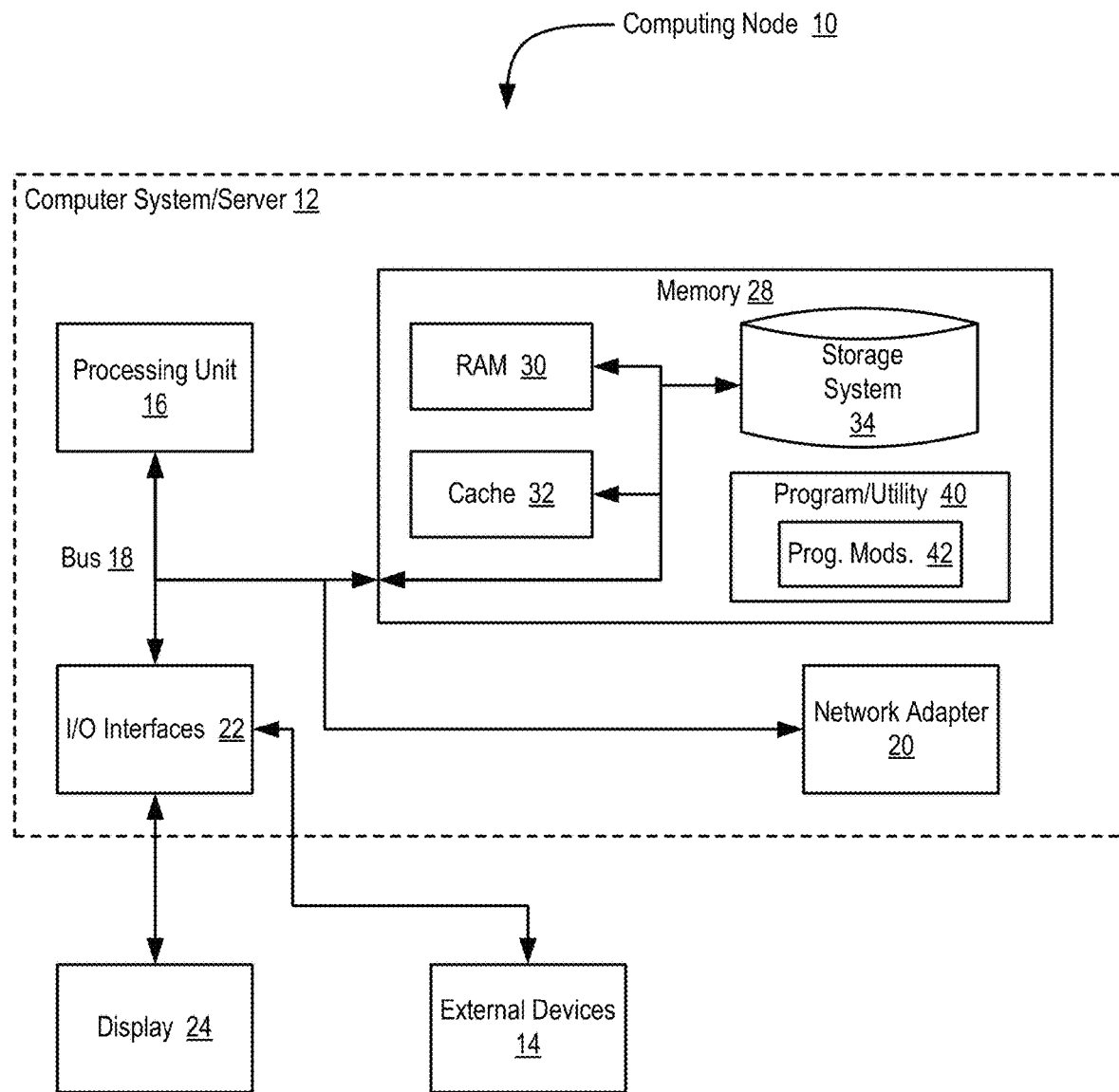
FIG. 1 depicts a cloud computing node according to an embodiment of the present invention.

Example methods, apparatuses, and computer program products for visualizing migration of a resource of a distributed computing environment in accordance with the present invention are described with reference to the accompanying drawings, beginning with FIG. 1. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service ('SaaS'): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service ('Paas'): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service ('IaaS'): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node (10) is only one example of a suitable cloud computing node and is not intended to suggest any limitation as to the scope of use or functionality of embodiments of the invention described herein. Regardless, cloud computing node (10) is capable of being implemented and/or performing any of the functionality set forth hereinabove.

In cloud computing node (10) there is a computer system/server (12), which is operational with numerous other general purpose or special purpose computing system environments or configurations. Examples of well-known computing systems, environments, and/or configurations that may be suitable for use with computer system/server (12) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (12) may be described in the general context of computer system executable instructions, such as program modules, being executed by a computer system. Generally, program modules may include routines, programs, objects, components, logic, data structures, and so on that perform particular tasks or implement particular abstract data types. Computer system/server (12) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server (12) in cloud computing node (10) is shown in the form of a general-purpose computing device. The components of computer system/server (12) may include, but are not limited to, one or more processors or processing units (16), a system memory (28), and a bus (18) that couples various system components including system memory (28) to processor (16).

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture ('ISA') bus, Micro Channel Architecture ('MCA') bus, Enhanced ISA ('EISA') bus, Video Electronics Standards Association ('VESA') local bus, and Peripheral Component Interconnect ('PCI') bus.

Computer system/server (12) typically includes a variety of computer system readable media. Such media may be any available media that is accessible by computer system/server (12), and it includes both volatile and non-volatile media, removable and non-removable media.

System memory (28) can include computer system readable media in the form of volatile memory, such as random access memory ('RAM') (30) and/or cache memory (32). Computer system/server (12) may further include other removable/non-removable, volatile/non-volatile computer system storage media. By way of example only, storage system (34) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (18) by one or more data media interfaces. As will be further depicted and described below, memory (28) may include at least one program product having a set (e.g., at least one) of program modules that are configured to carry out the functions of embodiments of the invention.

Program/utility (40), having a set (at least one) of program modules (42), may be stored in memory (28) by way of example, and not limitation, as well as an operating system, one or more application programs, other program modules, and program data. Each of the operating system, one or more application programs, other program modules, and program data or some combination thereof, may include an implementation of a networking environment. Program modules (42) generally carry out the functions and/or methodologies of embodiments of the invention as described herein.

Computer system/server (12) may also communicate with one or more external devices (14) such as a keyboard, a pointing device, a display (24), etc.; one or more devices that enable a user to interact with computer system/server (12); and/or any devices (e.g., network card, modem, etc.) that enable computer system/server (12) to communicate with one or more other computing devices. Such communication can occur via Input/Output ('I/O') interfaces (22). Still yet, computer system/server (12) can communicate with one or more networks such as a local area network ('LAN'), a general wide area network ('WAN'), and/or a public network (e.g., the Internet) via network adapter (20). As depicted, network adapter (20) communicates with the other components of computer system/server (12) via bus (18). It should be understood that although not shown, other hardware and/or software components could be used in conjunction with computer system/server (12). Examples, include, but are not limited to: microcode, device drivers, redundant processing units, external disk drive arrays, RAID systems, tape drives, and data archival storage systems, etc.

Figure 2:
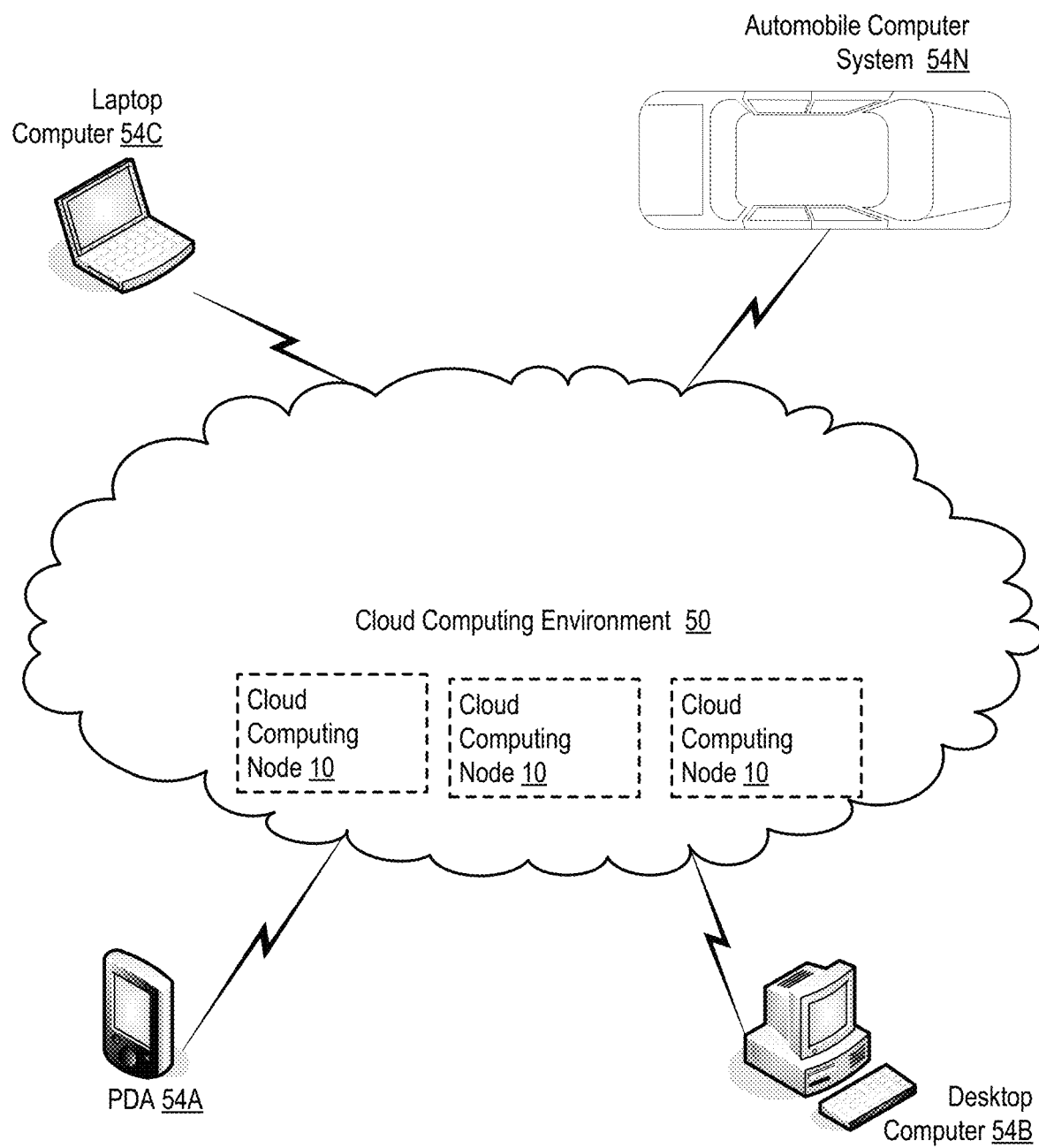
FIG. 2 depicts a cloud computing environment according to an embodiment of the present invention.

Referring now to FIG. 2, illustrative cloud computing environment (50) is depicted. As shown, cloud computing environment (50) comprises one or more cloud computing nodes (10) with which local computing devices used by cloud consumers, such as, for example, personal digital assistant ('PDA') or cellular telephone (54A), desktop computer (54B), laptop computer (54C), and/or automobile computer system (54N) may communicate. The cloud computing nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A-N) shown in FIG. 2 are intended to be illustrative only and that computing nodes (10) and cloud computing environment (50) can communicate with any type of computerized device over any type of network and/or network addressable connection (e.g., using a web browser).

Figure 3:
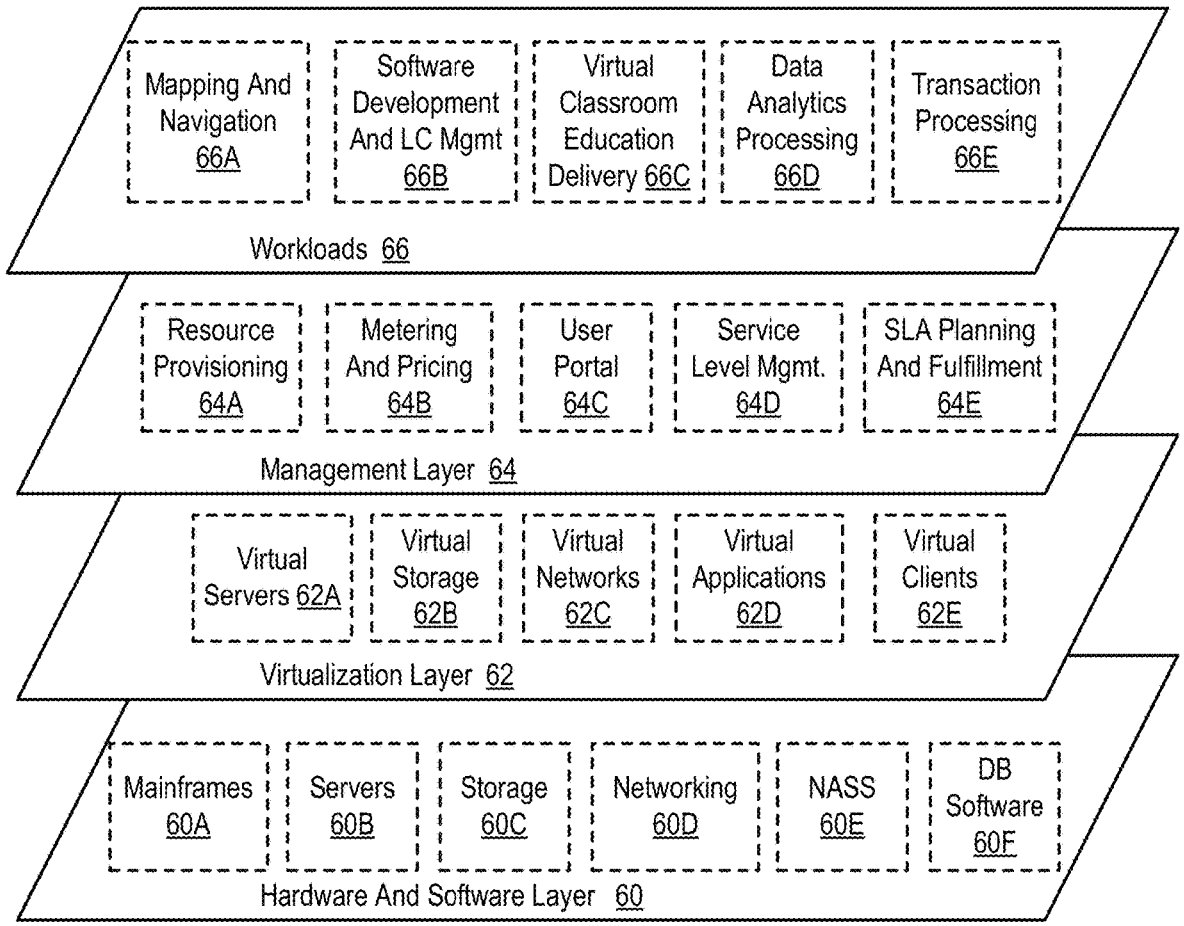
FIG. 3 depicts abstraction model layers according to an embodiment of the present invention.

Referring now to FIG. 3, a set of functional abstraction layers provided by cloud computing environment (element 50 in FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer (60) includes hardware and software components. Examples of hardware components include mainframes (60A), in one example IBM® zSeries® systems; RISC (Reduced Instruction Set Computer) architecture based servers (60B), in one example IBM pSeries® systems; IBM xSeries® systems; IBM BladeCenter® systems; storage devices (60C); networks and networking components (60D). Examples of software components include network application server software (60E), in one example IBM WebSphere® application server software; and database software (60F), in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (62) provides an abstraction layer from which the following examples of virtual entities may be provided: virtual servers (62A); virtual storage (62B); virtual networks (62C), including virtual private networks; virtual applications (62D) and operating systems; and virtual clients (62E).

In one example, management layer (64) may provide the functions described below. Resource provisioning (64A) provides dynamic procurement of computing resources and other resources that are utilized to perform tasks within the cloud computing environment. Metering and Pricing (64B) provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal (64C) provides access to the cloud computing environment for consumers and system administrators. Service level management (64D) provides cloud computing resource allocation and management such that required service levels are met. Service Level Agreement (SLA) planning and fulfillment (64E) provides pre-arrangement for, and procurement of, cloud computing resources for which a future requirement is anticipated in accordance with an SLA.

Workloads layer (66) provides examples of functionality for which the cloud computing environment may be utilized. Examples of workloads and functions which may be provided from this layer include: mapping and navigation (66A); software development and lifecycle management (66B); virtual classroom education delivery (66C); data analytics processing (66D); and transaction processing (66E).

Figure 4:
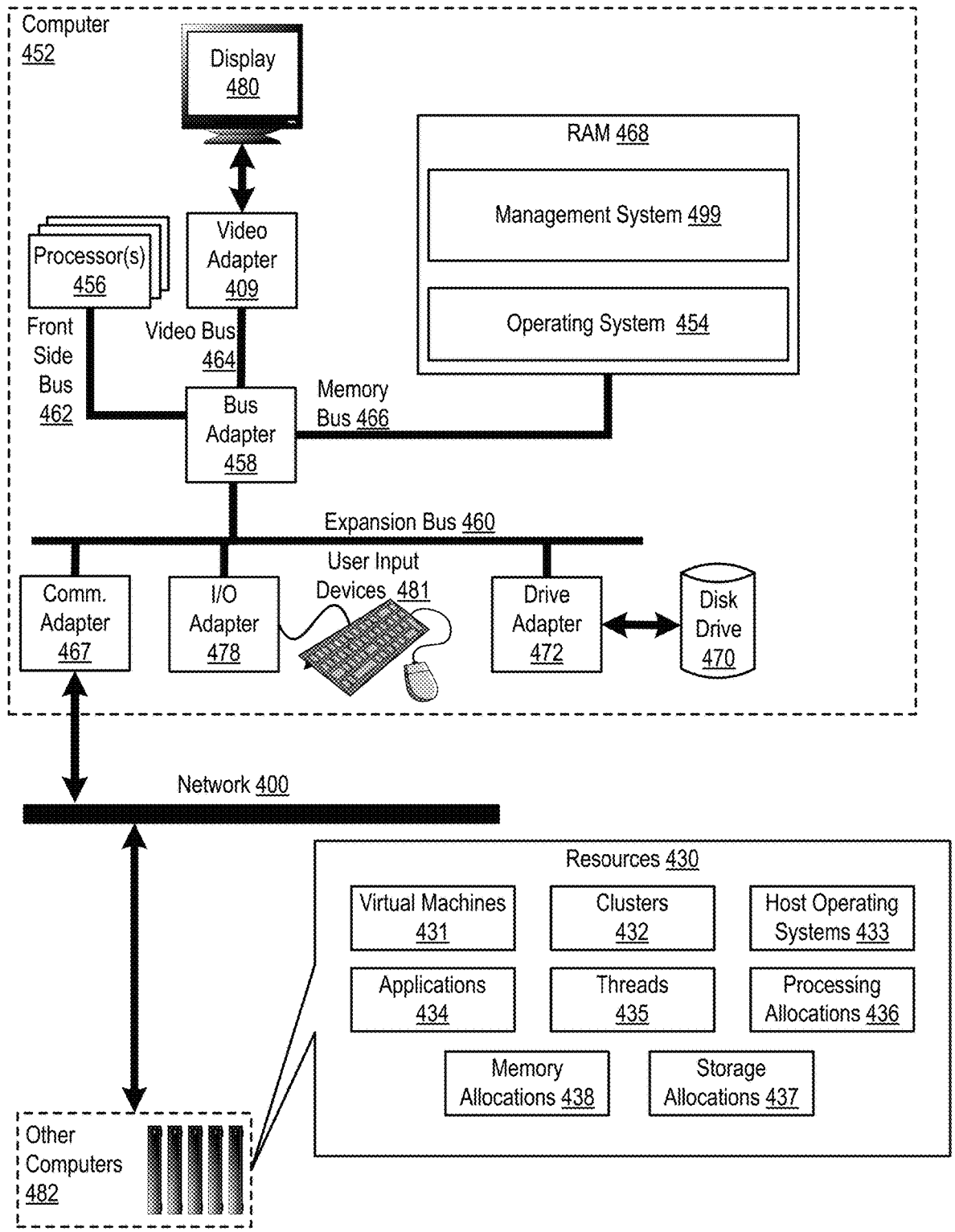
FIG. 4 sets forth a block diagram of automated computing machinery comprising an example computer useful in visualizing migration of a resource of a distributed computing environment according to embodiments of the present invention.

For further explanation, FIG. 4 sets forth a block diagram of automated computing machinery comprising an example computer useful in visualizing migration of a resource of a distributed computing environment according to embodiments of the present invention. The computer (452) of FIG. 4 includes at least one computer processor (456) or 'CPU' as well as random access memory (468) ('RAM') which is connected through a high speed memory bus (466) and bus adapter (458) to processor (456) and to other components of the computer (452).

Stored in RAM (468) is a management system (499), a module of computer program instructions that, when executed causes the computer (452) of FIG. 4 to manage resources of a distributed computing environment. In the example of FIG. 4, a distributed computing environment (not shown) is created on components of other computers (482). The management system may also be configured to administer provisioning of virtual machines, cloud resources, memory, and the like; track customer or user usage of cloud resources; provide a systems management interface for configuration of virtual machine environments; and so on.

Examples of such resources include virtual machines (431), clusters (432) of hardware devices or virtualized hardware, host operating systems (433), applications (434), threads or processes (435), processing allocations (436), storage allocations (436), memory allocations (438), and so on as will occur to readers of skill in the art. In the example of FIG. 4, several resources (430) may be executed, instantiated, hosted, virtualized, or implemented by other computers (482) coupled via a data communications network (400) to the computer (452). Also, users (not shown here) may be coupled via one or more data communications network (400) to utilize the resources (430).

In the example of FIG. 4, the management system (499) may visualize migration of a resource of a distributed computing environment in accordance with embodiments of the present invention by displaying, within a graphical user interface (GUI), one or more graphical resource representations. Each graphical resource representation represents a resource of a distributed computing environment. Each graphical resource representation is displayed in a particular location within the GUI according to a location of the resource within the distributed computing environment. The management system (499) is also configured to display, within the GUI, a first graphical migration representation. The first graphical migration representation represents a first transfer operation of a first resource of the distributed computing environment. The management system (499) is also configured to update based on a progress of the first transfer operation, within the GUI at least one of: the first graphical migration representation and a location of at least one of the one or more graphical resource representations.

Also stored RAM (468) of the computer (452) is an operating system (454). Operating systems useful for visualizing migration of a resource of a distributed computing environment according to embodiments of the present invention include UNIX™ Linux™ Microsoft XP™, AIX™ IBM's i5/OS™, and others as will occur to those of skill in the art. The operating systems (454) and the management system (499) in the example of FIG. 4 are shown in RAM (468), but many components of such software typically are stored in non-volatile memory also, such as, for example, on a disk drive (470).

The computer (452) of FIG. 4 includes disk drive adapter (472) coupled through expansion bus (460) and bus adapter (458) to the processors (456) and other components of the computer (452). Disk drive adapter (472) connects non-volatile data storage to the computer (452) in the form of the disk drive (470). Disk drive adapters useful in computers for visualizing migration of a resource of a distributed computing environment according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (452) of FIG. 4 includes one or more input/output ('I/O') adapters (478). I/O adapters implement user-oriented input/output through, for example, software drivers and computer hardware for controlling output to display devices such as computer display screens, as well as user input from user input devices (481) such as keyboards and mice. The example computer (452) of FIG. 4 includes a video adapter (409), which is an example of an I/O adapter specially designed for graphic output to a display device (480) such as a display screen or computer monitor. The video adapter (409) is connected to the processors (456) through a high speed video bus (464), bus adapter (458), and the front side bus (462), which is also a high speed bus.

The exemplary computer (452) of FIG. 4 includes a communications adapter (467) for data communications with the other computers (482) and for data communications with the data communications network (400). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for visualizing migration of a resource of a distributed computing environment according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 4 are for explanation, not for limitation. Data processing systems useful according to various embodiments of the present invention may include additional databases, servers, routers, other devices, and peer-to-peer architectures, not shown in FIG. 4, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 4.

Figure 5:
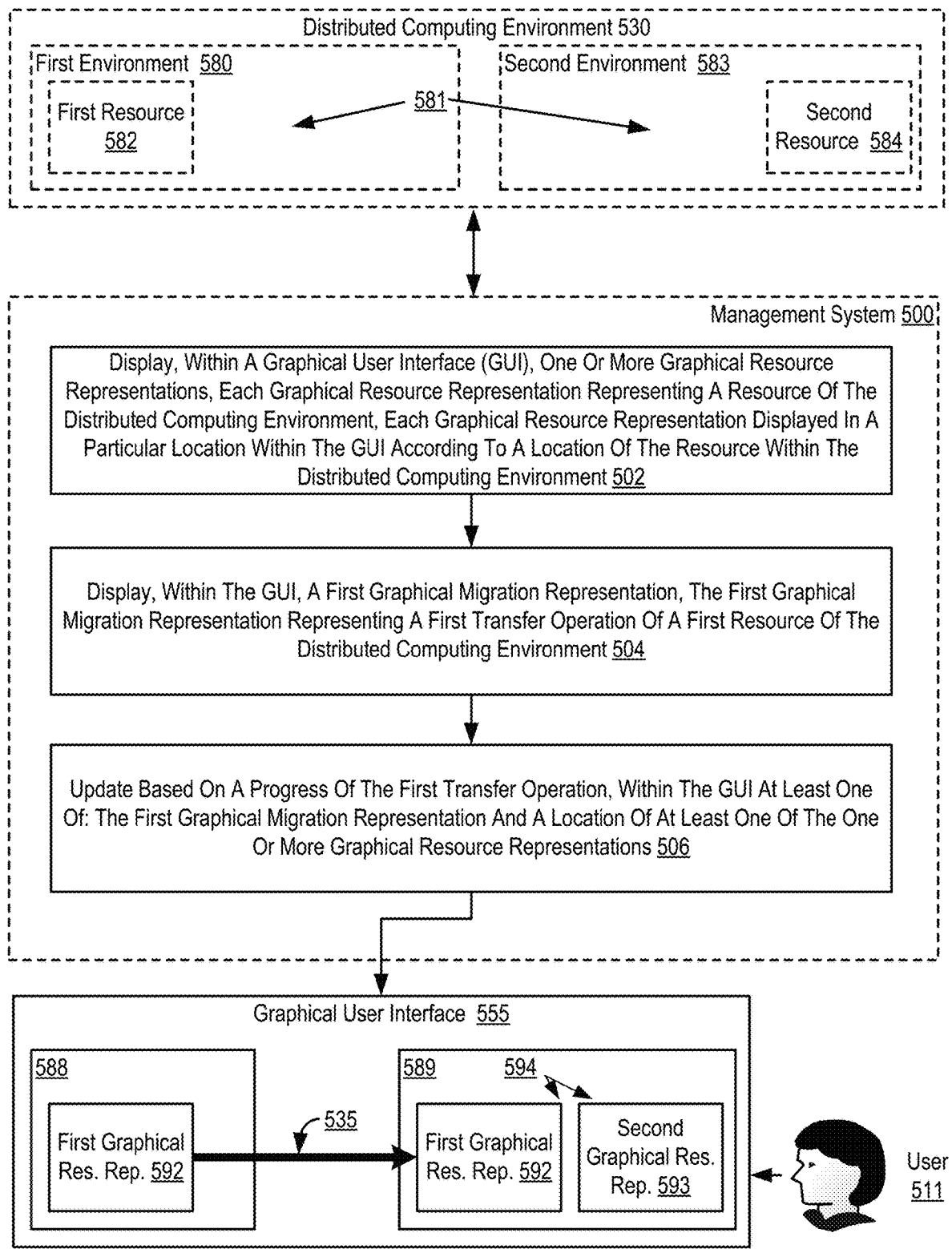
FIG. 5 sets forth a flow chart illustrating an example method for visualizing migration of a resource of a distributed computing environment according to embodiments of the present invention.

For further explanation, FIG. 5 sets forth a flow chart illustrating an exemplary method for visualizing migration of a resource of a distributed computing environment according to embodiments of the present invention. A distributed computing environment refers to a collection of computers, networks, and automated computing machinery configured to perform distributed processing. A non-limiting example of a distributed computing environment includes a cloud environment having a virtualized computing platform in which a user may be provided access to computing resources without knowledge, ownership, or physical access to the computer resources. The hardware, software, and capabilities of the components of a distributed computing environment or cloud environment may be offered to users as services or objects and may generally be referred to as resources. Non-limiting examples of resources include virtual machines, processing clusters, host operating systems, applications, processing threads, processing allocations, storage allocations, memory allocations, and any many others as will occur to readers of skill in the art.

In the example of FIG. 5, the distributed computing environment (530) includes a plurality (581) of resources. The method of FIG. 5 includes a management system (500) for visualizing migration of a resource of the distributed computing environment (530).

The method of FIG. 5 includes the management system (500) displaying (502), within a graphical user interface (GUI) (555), one or more graphical resource representations (594). A graphical resource representation represents a resource of the distributed computing environment (530). Each graphical resource representation is displayed in a particular location within the GUI according to a location of the represented resource within the distributed computing environment (530). Displaying (502), within a GUI, one or more graphical resource representations (594) may be carried out by identifying resources of the distributed computing environment and for each identified resource, creating a visual representation of the resource within the GUI. For example, the management system (500) may identify a first resource (582) of the distributed computing environment (530) and create a first graphical resource representation (592) representing the first resource (582).

Displaying (502), within a GUI, one or more graphical resource representations (594) may be carried out by determining a location of a resource relative to other resources and to infrastructure of the distributed computing environment (530), such as sub environments and hosts. In the example of FIG. 5, the management system (500) may determine that the first resource (582) is located within a first environment (580) within the distributed computing environment (530) and consequently may display the first graphical resource representation (592) within a first environment representation (588). An environment may be any type of distributed computing environment, sub-distributed computing environment, or host of resources within a distributed computing environment. In particular embodiments, an environment representation is a type of graphical resource representation.

In the example of FIG. 5, the distributed computing environment (530) also includes a second resource (584) within a second environment (583). The management system (500) displays a second resource representation (593) of the second resource (584) in a second environment representation (589) within the GUI (555).

The method of FIG. 5 also includes the management system (500) displaying (504), within the GUI (555), a first graphical migration representation (535). A graphical migration representation represents a transfer operation of a resource of the distributed computing environment (530). In a particular embodiment, a graphical migration representation visually indicates parameters and configuration data associated with a transfer operation of a resource of the distributed computing environment (530). For example, a migration representation may include different colors or different shading to indicate progress, priority, or status associated with the transfer operation. As another example, a migration representation may also include arrow pointers to indicate a direction of data movement in a transfer operation. A size, shape, or symbol of a migration representation may also indicate information associated with the transfer operation, such as a type of the transfer operation, a priority of the transfer operation, a sequence of the transfer operation relative to other transfer operations, a bandwidth allocation available to the transfer operation, and many others as will occur to readers of skill in the art.

In the example GUI (555) of FIG. 5, the first graphical resource representation (592) is shown in both the first environment representation (588) and the second environment representation (589) with a first migration representation (535) connecting the two instances of the first graphical resource representation (592). In this example, the first migration representation (535) represents a first transfer operation of the first resource (582) to the second environment (583) of the distributed computing environment (530). A transfer operation may include any number of different types of operations available to resources of a distributed computing environment including but not limited to copying, deleting, creating, moving, uploading, and many others that will occur to readers of skill in the art. In a particular embodiment, the first transfer operation is a transfer of the first resource between different sub distributed computing environments. In another embodiment, the first transfer operation is a transfer of the first resource between different providers of sub distributed computing environments. Readers of skill in the art will also realize that the elements of the GUI (555) represent just an example of one of the many ways to represent graphical resource representations and graphical migration representations.

The method of FIG. 5 also includes the management system (500) updating (506) based on a progress of the first transfer operation, within the GUI (555) at least one of: the first graphical migration representation (535) and a location of at least one of one or more graphical resource representations (594). Updating (506) based on a progress of the first transfer operation, within the GUI (555) at least one of: the first graphical migration representation (535) and a location of at least one of the one or more graphical resource representations (594) includes determining a progress of the transfer operation (e.g., initiation, percentage complete, completed); and changing the representations within the GUI to reflect this progress.

For example, if the first resource (582) is being moved from the first environment (580) to the second environment (583), the management system (500) may create another instance of the first graphical resource representation in the second environment (589) and upon completion of the transfer operation, delete the first graphical resource representation (592) from the first environment representation. The management system (500) may also be configured to delete a migration representation upon completion of a transfer operation associated with the migration representation.

As explained above, FIG. 5 is just one example of visualizing migration of a resource according to embodiments of the present invention. The management system (500) may be configured to represent resources and migrations of resources in any number of ways with a GUI. As will be explained in greater detail in FIGS. 6 and 7, according to embodiments of the present invention, a GUI may also be used to not only visualize migration of a resource but also to control migration of resources.

Figure 6:
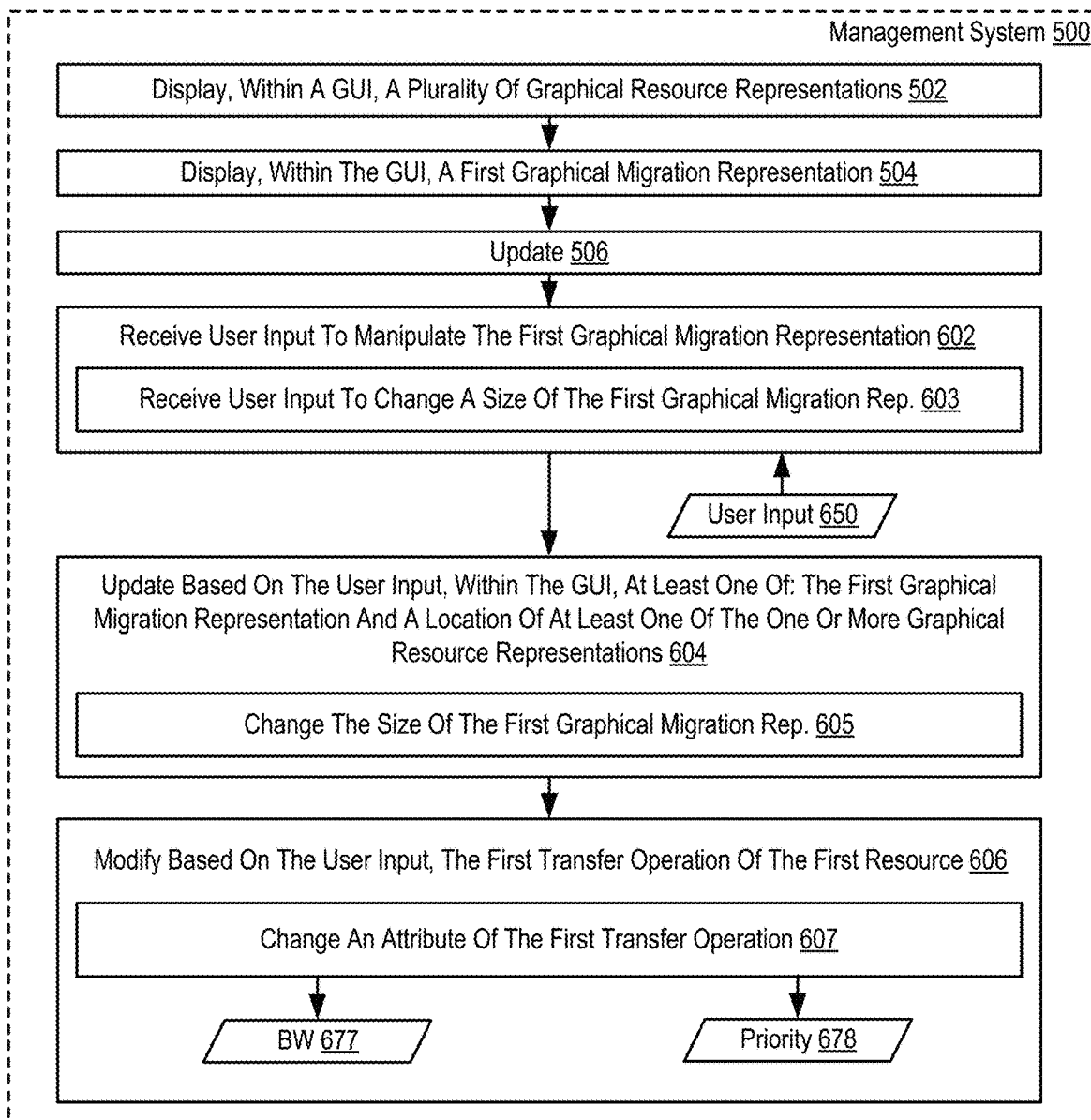
FIG. 6 sets forth a flow chart illustrating an additional example method for visualizing migration of a resource of a distributed computing environment according to embodiments of the present invention.
Figure 6:
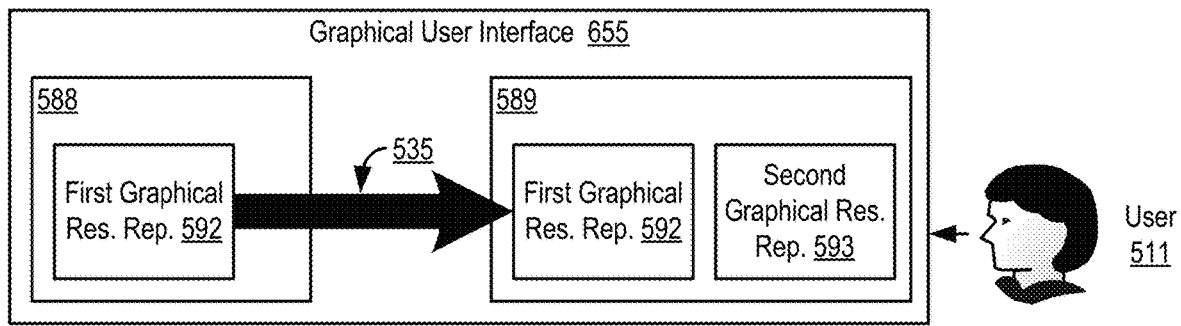

For further explanation, FIG. 6 sets forth a flow chart illustrating another example method for visualizing migration of a resource of a distributed computing environment according to embodiments of the present invention. The method of FIG. 6 is similar to the method of FIG. 5 in that the method of FIG. 6 also includes displaying (502), within a graphical user interface (GUI), one or more graphical resource representations; displaying (504), within the GUI, a first graphical migration representation; and updating (506) based on a progress of the first transfer operation, within the GUI at least one of: the first graphical migration representation and a location of at least one of the one or more graphical resource representations.

The method of FIG. 6 includes the management system (500) receiving (602), within the GUI (655), user input (650) to manipulate the first graphical migration representation (592). Receiving (602), within the GUI (655), user input (650) to manipulate the first graphical migration representation (592) may be carried out by receiving data indicating that the user has modified one or more properties associated with the first graphical migration representation. Examples of modifying a property of a migration representation include but are not limited to clicking on the migration representation, changing one or more entries in a table or input field associated with the migration representation, dragging, dropping, or resizing one or more areas of the migration representation. For example, a user may change a color, direction, size, or shape of the migration representation.

In the example of FIG. 6, receiving (602), within the GUI (655), user input (650) to manipulate the first graphical migration representation (592) optionally includes receiving (603) user input to change a size of the first graphical migration representation (535). Receiving (603) user input to change a size of the first graphical migration representation (535) may be carried out by receiving user input resizing the first graphical migration representation. In the example of FIG. 6, the size of the first graphical migration representation (535) is larger than the size of the first graphical migration representation (535) of FIG. 5 to indicate a change by the user to the bandwidth of the first transfer operation. That is, in the example of FIG. 6, the user increased the size of the first graphical migration representation to increase the amount of bandwidth available to the first transfer operation.

The method of FIG. 6 also includes the management system (500) updating (604) based on the user input (650), within the GUI (655) at least one of: the first graphical migration representation (635) and a location of at least one of the graphical resource representations. Updating (604) based on the user input (650), within the GUI (655) at least one of: the first graphical migration representation (635) and a location of at least one of the one or more graphical resource representations may be carried out by determining, based on the changes made by the user input, a progress of the transfer operation (e.g., initiation, percentage complete, completed); and changing the representations within the GUI to reflect this progress.

In the example of FIG. 6, updating (604) based on the user input (650), within the GUI (655) at least one of: the first graphical migration representation (635) and a location of at least one of the one or more graphical resource representations optionally includes changing (605) the size of the first graphical migration representation (635). Changing (605) the size of the first graphical migration representation (635) may be carried out by increasing or decreasing the visual size of the first graphical migration representation within the GUI.

The method of FIG. 6 also includes the management system (500) modifying (606) based on the user input (650), the first transfer operation of the first resource (582). Modifying (606) based on the user input (650), the first transfer operation of the first resource (582) may be carried out by changing one or more properties associated with the actual transfer operation, such as bandwidth allocation, processor allocation, storage allocation, priority, sequence number within series of scheduled transfers, and many others as will occur to readers of skill in the art.

In the method of FIG. 6, modifying (606) based on the user input (650), the first transfer operation of the first resource (582) includes changing (607) an attribute of the first transfer operation. Examples of attributes include a bandwidth allocation (677) associated with the first transfer operation and a priority (678) associated with the first transfer operation. A bandwidth allocation may indicate the amount of bandwidth available to transfer data in the transfer operation. Priority may be an indication of the relative importance of the transfer compared to other transfers of resources within the distributed computing environment. Changing (607) an attribute of the first transfer operation may be carried out by storing a new bandwidth allocation or a new priority for the transfer operation.

For example, if the first resource (582) is being moved from the first environment (580) to the second environment (583), the management system (500) may create the first migration representation (535) with a set of parameters that represent the parameters associated with the actual transfer, including priority and bandwidth allocation. Continuing with this example, a user may change the parameters associated with migration representation to change the parameters associated with the actual transfer. That is, according to embodiments of the present invention, the GUI may be used to not only visualize the migration of resources but also alter, change, or otherwise control the migration of resources within the distributed computing environment.

Figure 7:
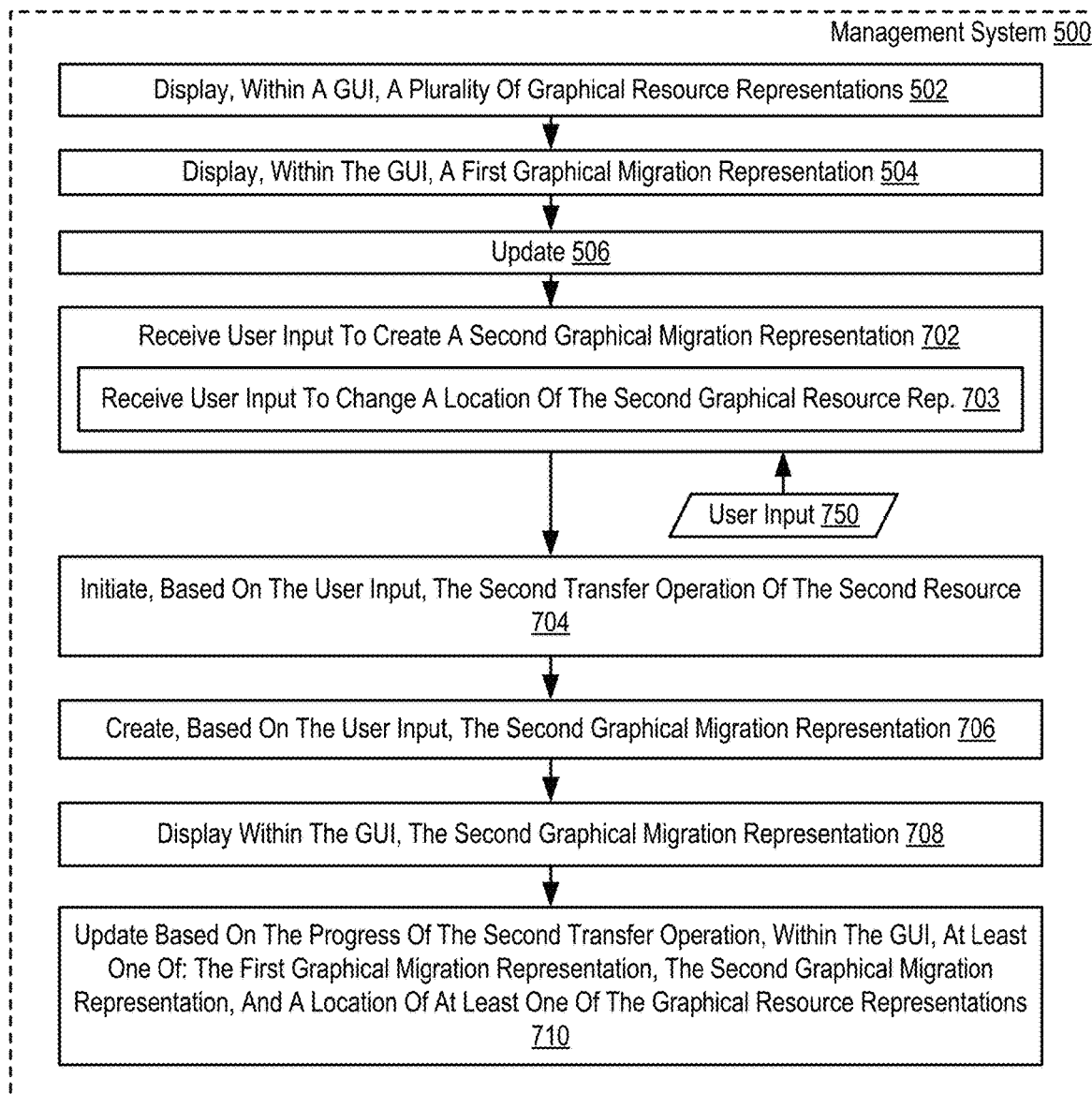
FIG. 7 sets forth a flow chart illustrating an additional example method for visualizing migration of a resource of a distributed computing environment according to embodiments of the present invention.
Figure 7:
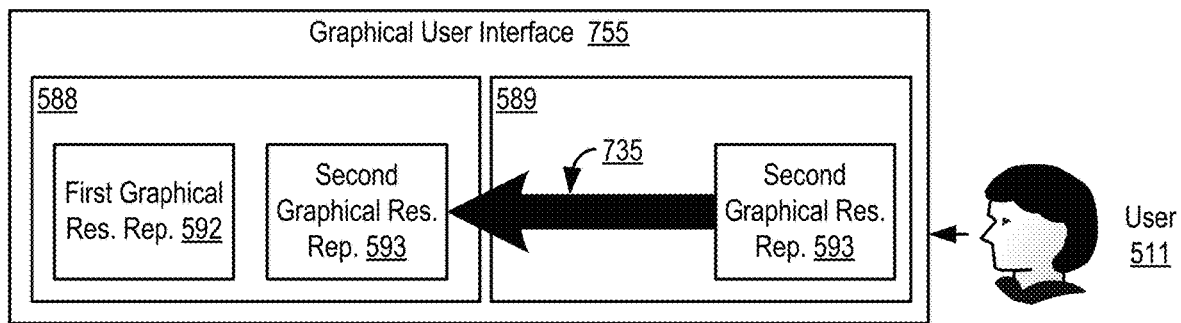

For further explanation, FIG. 7 sets forth a flow chart illustrating another example method for visualizing migration of a resource of a distributed computing environment according to embodiments of the present invention. The method of FIG. 7 is similar to the method of FIG. 5 in that the method of FIG. 7 also includes displaying (502), within a graphical user interface (GUI), one or more graphical resource representations; displaying (504), within the GUI, a first graphical migration representation; and updating (506) based on a progress of the first transfer operation, within the GUI at least one of: the first graphical migration representation and a location of at least one of the one or more graphical resource representations.

The method of FIG. 7 includes the management system (500) receiving (702) within the GUI (755), user input (750) to create a second graphical migration representation (735). In the example of FIG. 7, the second graphical migration representation (735) represents a second transfer operation of the second resource (584) of the plurality (581) of resources of the distributed computing environment (530). Receiving (702) within the GUI (755), user input (750) to create a second graphical migration representation (735) may be carried out by receiving user input that indicates a user desire to migrate a resource, including moving, copying, deleting, or otherwise changing the status of the resource within the distributed computing environment to another location within the GUI, such as from the second environment representation (589) to the first environment representation (588).

In the example of FIG. 7, receiving (702) within the GUI (755), user input (750) to create a second graphical migration representation (735) optionally includes receiving (703) user input to change within the GUI (755), a location of the second graphical resource representation (593) representing the second resource (584). Receiving (703) user input to change within the GUI (755), a location of the second graphical resource representation (593) representing the second resource (584) may be carried out by detecting a drag and drop operation, within the GUI, of the second graphical resource representation. That is, in a particular embodiment, a user can indicate creation of a second graphical migration representation by moving a graphical resource representation.

The method of FIG. 7 includes the management system (500) initiating (704), based on the user input (750), the second transfer operation of the second resource (584). Initiating (704), based on the user input (750), the second transfer operation of the second resource (584) may be carried out by transmitting a message to the distributed computing environment to migrate a resource, including moving, copying, deleting, or otherwise changing the status of the resource within the distributed computing environment.

The method of FIG. 7 also includes the management system (500) creating (706), based on the user input (750), the second graphical migration representation (593). Creating (706), based on the user input (750), the second graphical migration representation (593) may be carried out by storing data indicating parameters associated with the transfer operation, such as bandwidth allocation and priority of the transfer operation.

The method of FIG. 7 also includes the management system (500) displaying (708) within the GUI (755), the second graphical migration representation (593). Displaying (708) within the GUI (755), the second graphical migration representation (593) may be carried out by selecting a symbol, shape, and size of a graphical migration representation that best matches the parameters of the second transfer operation.

The method of FIG. 7 also includes the management system (500) updating (710) based on a progress of the second transfer operation, within the GUI (755) at least one of: the first graphical migration representation, the second graphical migration representation (735), and a location of at least one of the graphical resource representations. Updating (710) based on a progress of the second transfer operation, within the GUI (755) at least one of: the first graphical migration representation, the second graphical migration representation (735), and a location of at least one of the one or more graphical resource representations may be carried out by determining a progress of the transfer operation (e.g., initiation, percentage complete, completed); and changing the representations within the GUI to reflect this progress.

For example, if the second resource (584) is being moved from the second environment (583) to the first environment (580), the management system (500) may create the second migration representation (735) with a set of parameters that represent the parameters associated with the actual transfer, including priority and bandwidth allocation. Continuing with this example, a user may change the parameters associated with migration representation to change the parameters associated with the actual transfer. That is, according to embodiments of the present invention, the GUI may be used to not only visualize the migration of resources but also alter, change, or otherwise control the migration of resources within the distributed computing environment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of visualizing migration of a resource of a distributed computing environment, the method comprising:
displaying, within a graphical user interface (GUI), one or more graphical resource representations, each graphical resource representation representing a resource of a distributed computing environment, each graphical resource representation displayed in a particular location within the GUI according to a location of the resource within the distributed computing environment;
displaying, within the GUI, a first graphical migration representation, the first graphical migration representation representing a first transfer operation of a first resource of the distributed computing environment, wherein the first graphical migration representation visually indicates parameters and configuration data associated with the first transfer operation of the first resource including indicating a direction of data movement in the first transfer operation;
updating based on a progress of the first transfer operation, within the GUI at least one of: the first graphical migration representation and a location of at least one of the one or more graphical resource representations;
receiving, within the GUI, user input to manipulate a size of the first graphical migration representation; and
in response to receiving the user input to manipulate the size of the first graphical migration representation:
changing a priority attribute of the first transfer operation, the priority attribute indicative of an importance of the first transfer operation relative to other transfer operations within the distributed computing environment;
changing a bandwidth allocation attribute of the first transfer operation, the bandwidth allocation attribute indicative of an amount of bandwidth available for transferring the first resource of the distributed computing environment via the first transfer operation; and
changing the size of the first graphical migration representation within the GUI in accordance with the respective changes to the priority and bandwidth allocation attributes of the first transfer operation.

2. The method of claim 1 further comprising:
receiving within the GUI, user input to create a second graphical migration representation, the second graphical migration representation representing a second transfer operation of a second resource of the plurality of resources of the distributed computing environment;
initiating, based on the user input, the second transfer operation of the second resource;
creating, based on the user input, the second graphical migration representation;
displaying within the GUI, the second graphical migration representation; and
updating based on a progress of the second transfer operation, within the GUI at least one of: the first graphical migration representation, the second graphical migration representation, and a location of at least one of the one or more graphical resource representations.

3. The method of claim 2 wherein receiving within the GUI, user input to create a second graphical migration representation, includes receiving user input to change within the GUI, a location of a second graphical resource representation representing the second resource.

4. The method of claim 1 wherein the first transfer operation is a transfer of the first resource between different sub distributed computing environments.

5. The method of claim 1 wherein the first transfer operation is a transfer of the first resource between different providers of sub distributed computing environments.

6. The method of claim 1 wherein the first graphical migration representation indicates information associated with the first transfer operation of the first resource.

7. The method of claim 6 wherein the information associated with the first transfer operation of the first resource includes at least one of: a type of transfer operation, a priority of the transfer operation, a sequence of the transfer operation relative to other transfer operations, and a bandwidth allocation available to the transfer operation.

* * * * *